United States Patent [19]
Baskey et al.

[11] Patent Number: 5,535,326
[45] Date of Patent: Jul. 9, 1996

[54] SYSTEM AND METHOD FOR LOGICAL CONSOLE VERIFICATION AND FEEDBACK

[75] Inventors: Michael E. Baskey, Wappingers Falls, N.Y.; Colette A. Mastrangelo, Danbury; Paul M. Mayer, Middlebury, both of Conn.

[73] Assignee: International Business Machines Corporation, Armonk, N.Y.

[21] Appl. No.: 470,375

[22] Filed: Jun. 6, 1995

Related U.S. Application Data

[63] Continuation of Ser. No. 246,380, May 20, 1994, abandoned, which is a continuation of Ser. No. 922,907, Jul. 31, 1992, abandoned.

[51] Int. Cl.⁶ .................................................. G06F 11/34
[52] U.S. Cl. ................ 395/182.02; 370/14; 364/284.4; 364/DIG. 1
[58] Field of Search .................. 395/575, 181, 395/182.01, 182.02; 364/242.94, 242.95, 242.96, 284, 284.4, 940.940.61, 940.62, 229, 229.3, 229.4, 241.8, 943.9; 371/7, 8.1, 8.2, 11.1, 11.3; 370/14, 13

[56] References Cited

U.S. PATENT DOCUMENTS

| | | | |
|---|---|---|---|
| 4,075,693 | 2/1978 | Fox et al. | 364/200 |
| 4,200,930 | 4/1980 | Rawlings et al. | 364/200 |
| 4,374,436 | 2/1983 | Armstrong | 371/11 |
| 4,486,852 | 12/1984 | Champlin et al. | 364/900 |
| 4,507,777 | 3/1985 | Tucker et al. | 370/16 |
| 4,511,958 | 4/1985 | Funk | 364/200 |
| 4,577,060 | 3/1986 | Webb et al. | 179/2 |
| 4,682,326 | 7/1987 | Ulig | 370/89 |
| 4,698,805 | 10/1987 | Sasuta et al. | 370/97 |
| 4,731,784 | 3/1988 | Keller et al. | 370/86 |
| 4,747,100 | 5/1988 | Roach et al. | 370/86 |
| 4,802,164 | 1/1989 | Fukuoka et al. | 371/16 |
| 4,836,317 | 6/1989 | Straussman | 178/2 |
| 4,872,106 | 10/1989 | Slater | 364/200 |
| 4,881,074 | 11/1989 | Reichbauer et al. | 340/825 |
| 4,901,312 | 2/1990 | Hui et al. | 370/85 |
| 4,945,355 | 8/1990 | Blanchette | 370/85.8 |
| 5,029,159 | 7/1991 | Dolev | 370/16 |
| 5,121,486 | 6/1992 | Kurihara et al. | 395/575 |
| 5,210,746 | 5/1993 | Maher et al. | 370/79 |
| 5,276,863 | 1/1994 | Heider | 395/575 |

*Primary Examiner*—Robert W. Beausoliel, Jr.
*Assistant Examiner*—Trinh L. Tu
*Attorney, Agent, or Firm*—William A. Kinnaman, Jr.; Lily Neff

[57] ABSTRACT

A system and method for logical console verification and fallback. Conformity of physical equipment configurations with the logical console control and fallback plan is verified by sending messages through the backup paths and testing message response. The method of resource server or logical console fallback to a backup resource server or logical console includes the steps of verifying operational status of each physical component defined by the logical configuration description to assure availability. Tests can be manually or automatically generated. If all tests are completed successfully, resource server or console fallback is initiated.

20 Claims, 2 Drawing Sheets

SYSTEM AND METHOD FOR LOGICAL CONSOLE VERIFICATION AND FEEDBACK

CROSS-REFERENCE TO RELATED APPLICATIONS

This application is a continuation of application Ser. No. 08/246,380, filed May 20, 1994 now abandoned, which is a continuation of application Ser. No. 07/922,907, filed Jul. 31, 1992, now abandoned.

BACKGROUND OF THE INVENTION

1. Field of the Invention

The present invention relates to information processing systems and particularly to the management of distributed computer systems. In particular, the present invention relates to the management of failure recovery in distributed systems which provide remote operation facilities for computer hardware resources.

2. Background and Prior Art

The increasing power and complexity of large computer systems, frequently termed "mainframe computer systems", has resulted in an increase in the complexity of computer system operations. The drive for increased workforce productivity, however, has tended to reduce the number of personnel assigned to the operations task. The proliferation of large computer system complexes, such as those used by airline reservations systems, banking centers, and similar computer intensive businesses, has also contributed to the need for more effective facilities for the control of hardware systems resources.

Large computer systems have traditionally been operated from an attached console accessible to the computer operators in a computer room. Each computer system has a dedicated console. Thus, in a large complex of, for example, six computers, six operator consoles require monitoring. Each of these computer consoles displays messages in the order generated by the computer system. Many of the messages are informational, indicating the status of certain operations on the computer systems. Other messages provide warnings of current or impending problems. Finally, a third class of message requires operator response to a request for action, such as mounting a tape, or to correct an error detected in the system. It becomes increasingly difficult for an operator to monitor several consoles with several different types of messages and be able to effectively respond to each one.

One solution to the increasing flow of messages is to develop an automated operations facility that is able to interpret and classify messages. These types of facilities can be constructed to segregate messages by message type and to present the operator with those requiring attention. Automated operations facilities of this type are typically constructed using a workstation computer that can be connected directly to the large computer system. The workstation computer contains the necessary programs for receiving, analyzing, and responding to certain messages.

Productivity gains are frequently achieved by centralizing operator resources in a single operations area. This area may be on a different floor or in a different building than the large computers themselves. Centralization requires that remote access and control of the hardware resource be provided. However, remote access creates a series of problems.

The first problem is the need to develop a system which will allow access to the hardware resource independent of the location of that resource. Next, the system must be designed in a way that allows recovery from the failure of any component in the control system. In other words, control system component failure must not cause the failure of control of the larger system.

The problem of remote operations and management has been addressed in several ways. In U.S. patent application No. 07/577,967, filed Sep. 4, 1990, commonly assigned, an automated operations system is described which involves a controller coupled to the processor with remote workstation access for controlling that processor. This configuration provides control but limits remote access and fails to address the problem of control system redundancy and reconfiguration.

U.S. Pat. No. 5,005,122 suggests the use of a client server model for network management tasks. This system provides for management of a local area network (LAN) through the designation of a single network management node which directs other nodes to perform backup, software distribution, or other network management tasks. While this system provides a means for managing a network, there is no recognition or teaching of the management of a large mainframe hardware resource. In particular, there is no recognition of the requirement to establish fault tolerant connection facilities between a console client and the hardware resource.

The problem of creating a system for remotely controlling a resource such as a large computer system in a manner that allows remote access, failure recovery, and configuration flexibility is addressed in commonly assigned patent application Ser. No. 07/771,064 entitled "Centralized Control for Distributed Applications." The system of that application provides a means for establishing the location of the resource to be controlled and for creating a link between a logical console, a resource server and that resource. At least one resource server is attached to each resource to be controlled. Redundant resource servers provide gateway fallback options. The system is able to recognize and recover from the failure of any control system component.

There remains a technical problem of ensuring that the physical computer system structure meets the requirements of the logically defined structure. In particular, fallback to a second resource server or logical console will itself fail if the physical network configuration has been modified or if a device failure has occurred. The technical problem is to provide an information processing system and method for verifying the conformity of logical to physical configurations and for assuring failure fallback integrity.

SUMMARY OF THE INVENTION

The present invention is therefore directed to a system and method for logical console verification and fallback. The present invention verifies conformity of physical equipment configurations with the logical console control and fallback plan. The method of resource server or logical console fallback to a backup resource server or logical console includes the steps of verifying each physical component defined by the logical configuration description to assure conformity and testing for successful connection. Only after conformance verification does resource server or console fallback occur.

It is therefore an object of the present invention to provide a remote operations system with logical fallback console verification.

It is yet another object of the invention to establish a fallback methodology that tests the physical fallback link for conformity with logical link definitions prior to initiating fallback and terminates fallback upon test failure.

It is yet another object of the invention to establish a process for logical console fallback that assures consistent fallback to an operational console.

These and other objects of the invention will become clear through discussion of the preferred embodiment of the present invention which will be made with reference to the following drawings.

DETAILED DESCRIPTION OF THE PREFERRED EMBODIMENT

The preferred embodiment of the present invention is implemented to control hardware resources, and in particular, to control the operation of a mainframe computer system such as the IBM 3090 computer system (IBM and 3090 are registered trademarks of the IBM Corporation). It will be recognized, however, that the system of the present invention can be used to control other resources which require operator interaction including resources such as a production assembly line, chemical processing facility, or building environmental system.

Figure 1:
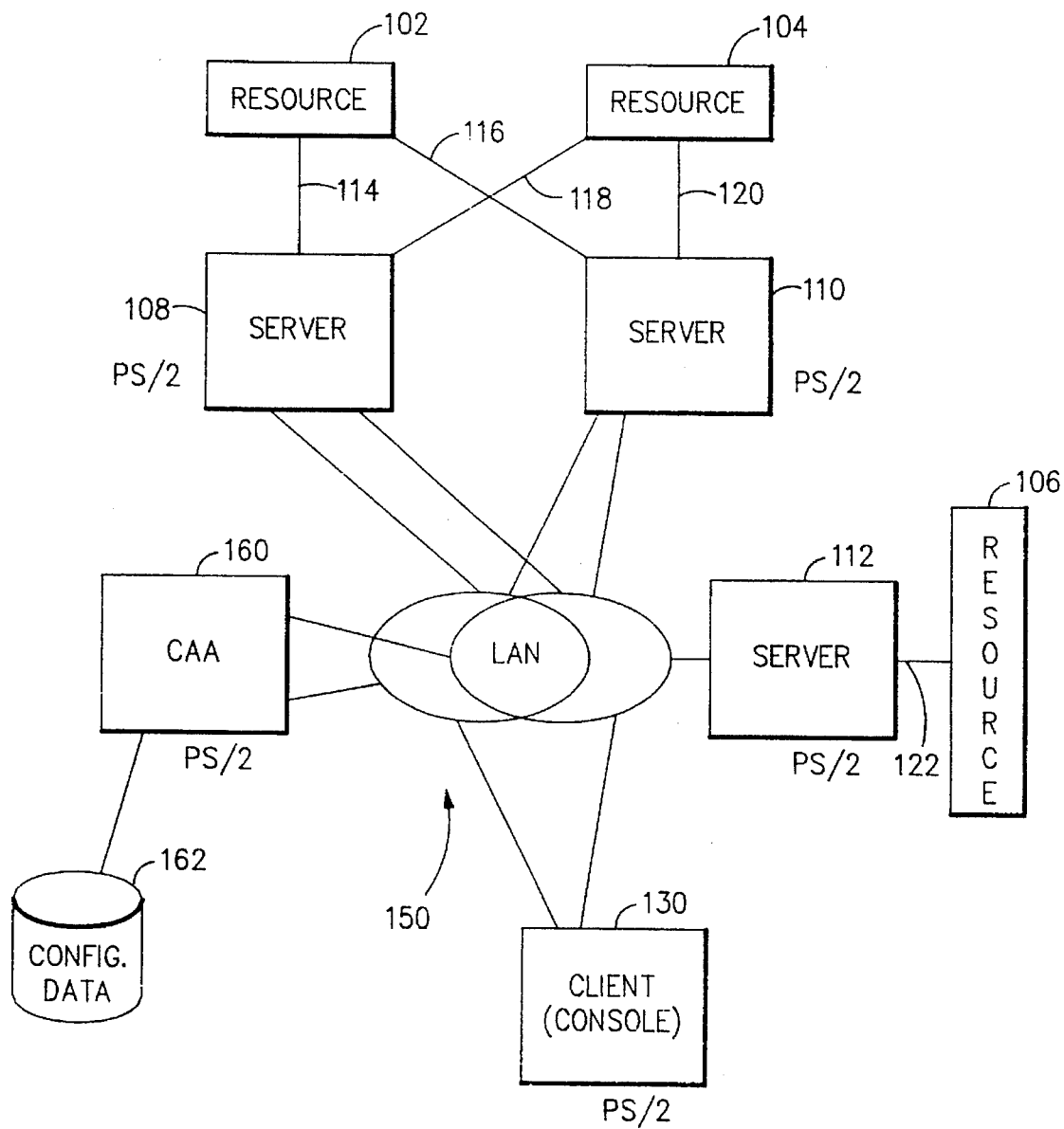
FIG. 1 is a block diagram illustrating a system created according to the present invention.

The structure of a system according to the present invention is shown generally in FIG. 1. Resources to be controlled are identified generally at 102, 104, and 106. It will be recognized that this system is applicable to any number of resources and the example of three is shown for illustrative purposes only.

Each resource is connected to at least one resource server workstation. Server workstations are shown at 108, 110, and 112. These workstations are an intelligent device such as an IBM Personal System/2 computer system (PS/2) (Personal System/2 and PS/2 are registered trademarks of the IBM Corporation). The servers are connected to hardware resources by communication lines 114, 116, 118, 120 and 122. In the preferred embodiment, a resource typically is connected to more than one server to provide a fallback control path. For example, resource 102 is connected via communication path 114 to server 108 and by communication path 116 to server 110.

A client workstation 130 (such as an IBM PS/2 computer system) is provided as a console for operator use. The client workstation manages the operator interaction including the presentation of messages to the operator and the generation or acceptance of commands for controlling the hardware resource. The separation of client and server functions allows a balancing of workload between the devices. It also allows a single client console to manage a number of hardware resources. In the example shown in FIG. 1, client console 130 can manage resources 102, 104, and 106.

The client console communicates with the servers by means of a local area network (LAN) shown generally at 150. This network can be any one of several known networks, such as the IBM Token Ring LAN, an Ethernet LAN, or others. In the preferred embodiment, the control scheme is implemented using dual token ring LANS which provide for redundancy in case of the failure by either individual LAN.

A central control facility containing control and administrative applications (CAA) is provided to control the operation of the control system. This control server 160 is a workstation which has been configured to support and control the overall operation of the resource control system. The control server provides centralized control to ensure that console access exists for each resource to be controlled and that the client workstations know how to access each resource and how to recover from component failure. Control server 160 manages the network based upon configuration data stored in a database 162. This data can be stored in a variety of known forms such as files on the server or data under the control of the database management system.

The configuration data consists of two major types of data. First, static configuration data contain a description of each hardware resource location to be controlled. It also contains the parameters necessary for accessing and controlling that resource and identifies primary and fallback access paths to that resource. The second type of data is dynamic configuration data describing the current configuration for controlling each resource. This data is maintained to assure that each resource is under the control of a console and for use by fallback processing routines to re-establish communications in the case of a failure.

Figure 2:
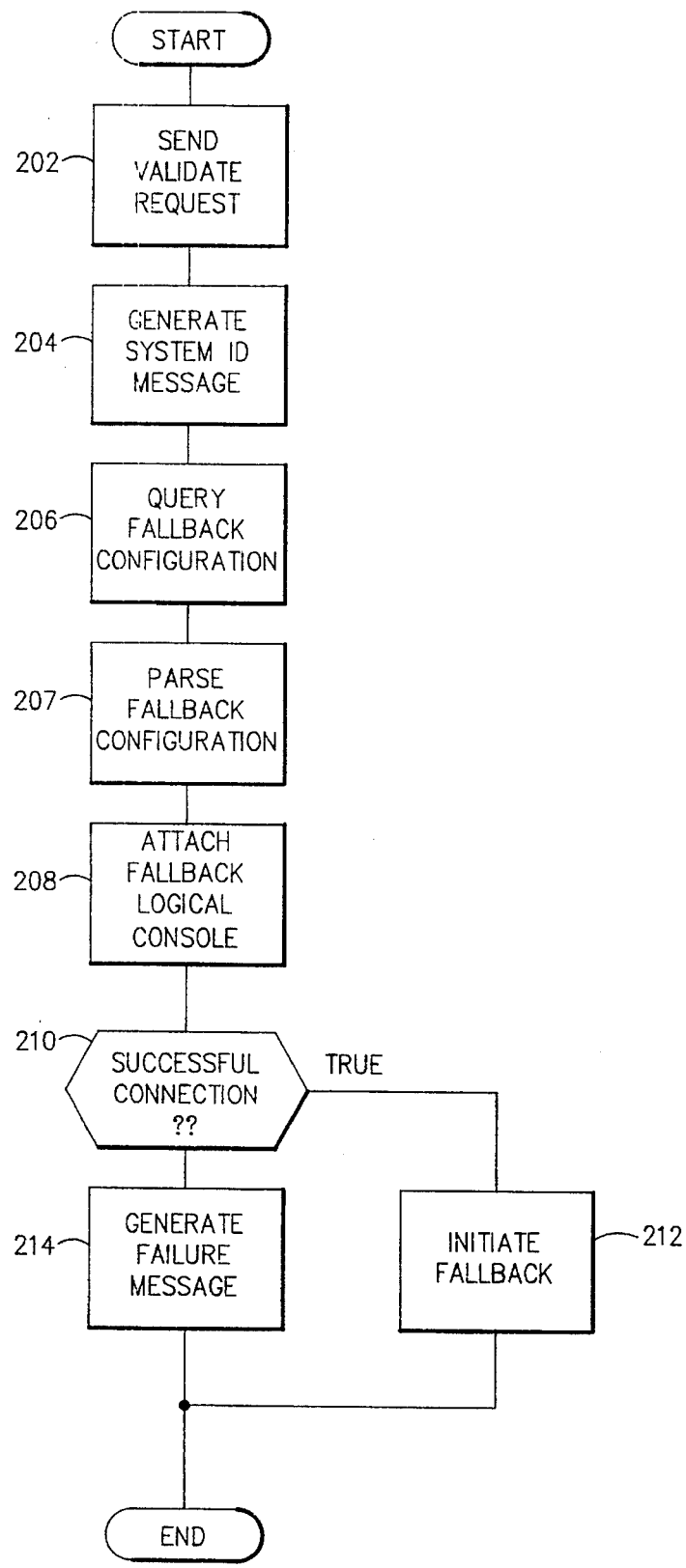
FIG. 2 is a flowchart illustrating the process steps of the logical fallback verification of the present invention.

The basic process of the present invention is described with reference to FIG. 2. The process of the present invention can operate in response to an explicit validate and fallback request issued by an operator, e.g. when a console or server is to be disconnected for service, or can operate in response to an unplanned component failure.

The operator or recovery process issues a VALIDATE request 202 to a controlled resource, e.g. resource 102. Resource 102 contains processing logic that recognizes the validate request and issues a system identifier message 204 directed to the defined alternate resource server, e.g. server 110 in FIG. 2. The address of the alternate resource server can be explicitly specified in the validate command or the resource can use a previously defined fallback server address contained in local storage.

Central control facility 160 accesses 206 the configuration files 162 to determine the fallback resource server and the fallback logical console workstation for the requesting system. The collected configuration information is parsed 207 and sent as the resource server identifier and workstation identifier.

Alternate resource server 110 attempts to establish communication 208 with a defined alternate logical console for the requesting resource 102. Resource server 110 determines the alternate logical console by querying the configuration database contained in control server 160. Once identified, server 110 establishes a session with the logical console, e.g. console 130. The alternate logical console may be the same workstation as the primary logical console depending upon the network configuration.

The network is tested to determine whether linking has been successful 210. A logical console linkage failure is indicated by the generation of linkage error message, or by the failure of alternate logical console to receive the messages sent by the VALIDATE request. If operating in manual validate mode, the operator will recognize link failure and terminate fallback processing. In automated mode, a message is transmitted back to the recovery process indicating alternate path failure thereby terminating fallback processing with the appropriate message 214. If linking has been successful, controller fallback is initiated 212 by the entry of a manual fallback command or automatically by the resource 102. All console messages and activities will then be directed from resource 102 through server 110 to the fallback logical console, e.g. 130.

It will be understood from the foregoing description that various modifications and changes may be made in the preferred embodiment of the present invention without departing from its true spirit. This description is intended for the purpose of illustration only and should not be construed in a limiting sense. The scope of this invention should be limited only by the language of the following claims.

We claim:

1. In an information handling system in which a resource is coupled to a primary logical console via a primary control path and to a fallback logical console via a fallback control path, said resource being normally controlled by said primary logical console via said primary control path but being switchable to said fallback control path for control by said fallback logical console, said fallback logical console being accessible to said resource via said fallback control path independently of whether said resource is being controlled by said fallback logical console, a method of handling the switching of said resource from said primary control path to said fallback control path, comprising the steps of:

prior to switching said resource to said fallback control path, transmitting a verification message from said resource to said fallback logical console via said fallback control path;

determining whether said verification message has been received by said fallback logical console;

switching said resource to said fallback control path in response to a determination that said verification message has been received by said fallback logical console; and terminating fallback processing without switching said resource to said fallback control path in response to a determination that said verification message has not been received by said fallback logical console.

2. The method of claim 1, comprising the further step of:

transmitting a verification request from said primary logical console to said resource, said resource transmitting said verification message to said fallback logical console in response to the transmission of said request from said primary logical console.

3. The method of claim 1 wherein said primary control path includes a primary resource controller interconnecting said resource and said primary logical console and wherein said fallback control path includes a fallback resource controller interconnecting said resource and said fallback logical console.

4. The method of claim 3 wherein said resource controllers and said logical consoles are interconnected by a network.

5. The method of claim 4, comprising the further step of:

maintaining fallback configuration data specifying said fallback control path using a configuration controller coupled to said network.

6. The method of claim 5 wherein said verification message is transmitted from said resource to said fallback logical console via said fallback resource controller.

7. The method of claim 6, comprising the further step of:

transmitting a request from said fallback resource controller to said configuration controller for the location of said fallback logical console in said network in response to the transmission of said verification message from said resource.

8. The method of claim 1 wherein said terminating step comprises the step of generating an error message.

9. The method of claim 1 wherein said step of switching said resource to said fallback control path is performed by a human operator.

10. The method of claim 1 wherein said step of switching said resource to said fallback control path is performed automatically.

11. The method of claim 1 wherein said step of switching said resource to said fallback control path comprises the step of transmitting a fallback command to said resource via said primary control path.

12. In an information handling system in which a resource is coupled to a primary logical console via a primary control path and to a fallback logical console via a fallback control path, said resource being normally controlled by said primary logical console via said primary control path but being switchable to said fallback control path for control by said fallback logical console, said fallback logical console being accessible to said resource via said fallback control path independently of whether said resource is being controlled by said fallback logical console, apparatus for handling the switching of said resource from said primary control path to said fallback control path, comprising:

means operable prior to switching said resource to said fallback control path for transmitting a verification message from said resource to said fallback logical console via said fallback control path;

means for determining whether said verification message has been received by said fallback logical console;

means responsive to a determination by said determining means that said verification message has been received by said fallback logical console for switching said resource to said fallback control path; and means responsive to a determination by said determining means that said verification message has not been received by said fallback logical console for terminating fallback processing without switching said resource to said fallback control path.

13. The apparatus of claim 12, further comprising:

means for transmitting a verification request from said primary logical console to said resource, said means for transmitting said verification message to said fallback logical console transmitting said message to said fallback logical console in response to the transmission of said request from said primary logical console.

14. The apparatus of claim 12 wherein said primary control path includes a primary resource controller interconnecting said resource and said primary logical console and wherein said fallback control path includes a fallback resource controller interconnecting said resource and said fallback logical console.

15. The apparatus of claim 14, further comprising a network interconnecting said resource controllers and said logical consoles.

16. The apparatus of claim 15, further comprising:

a configuration controller coupled to said network for maintaining fallback configuration data specifying said fallback control path.

17. The apparatus of claim 16 wherein said verification message is transmitted from said resource to said fallback logical console via said fallback resource controller.

18. The apparatus of claim 17 wherein said fallback resource server has a defined location in said network, said apparatus further comprising:

means responsive to the transmission of said verification message from said resource for transmitting a request from said fallback resource controller to said configuration controller for the location of said fallback logical console in said network.

19. The apparatus of claim 12 wherein said terminating means comprises means for generating an error message.

20. The apparatus of claim 12 wherein said means for switching said resource to said fallback control path comprises means for transmitting a fallback command to said resource via said primary control path.

* * * * *